PROCESS AND APPARATUS FOR COLLECTION OF METAL CONTAINERS
Original Filed July 25, 1967 4 Sheets-Sheet 1
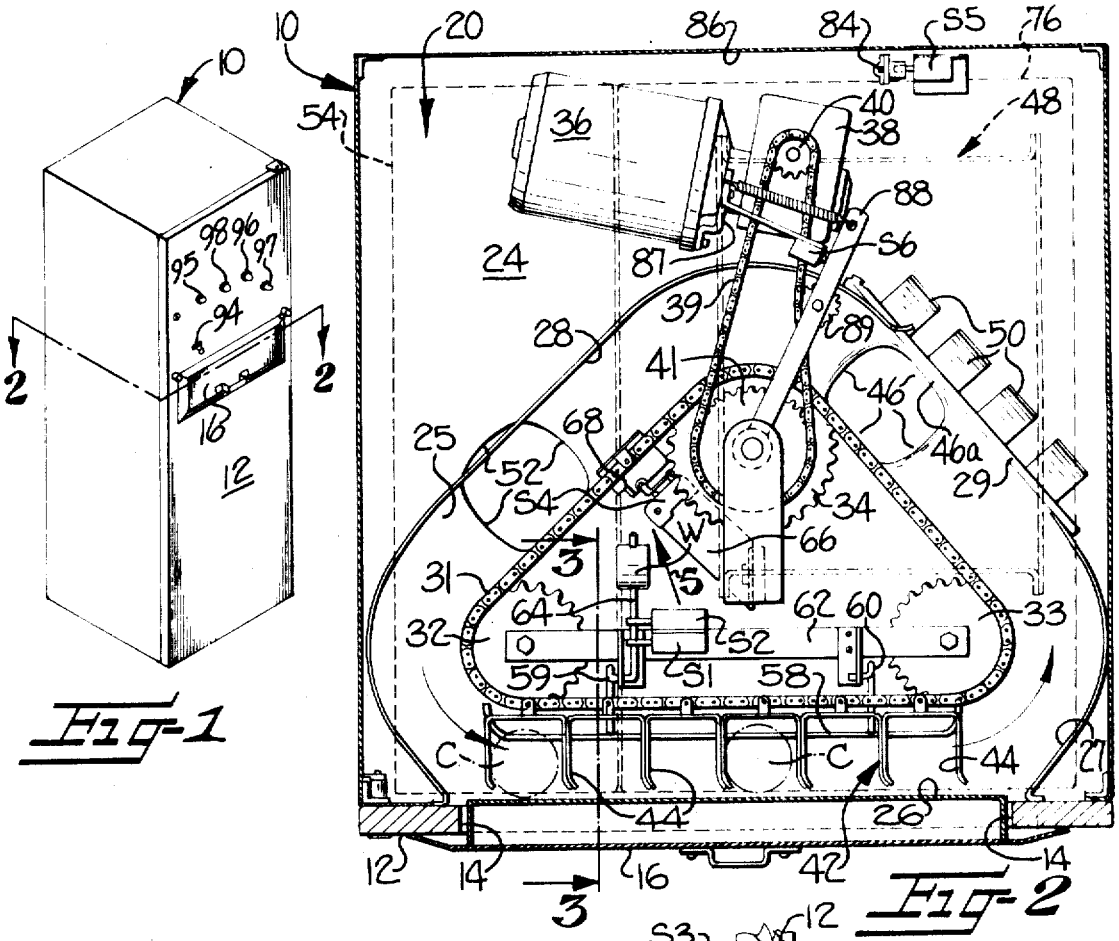
Fig-1
Fig-2
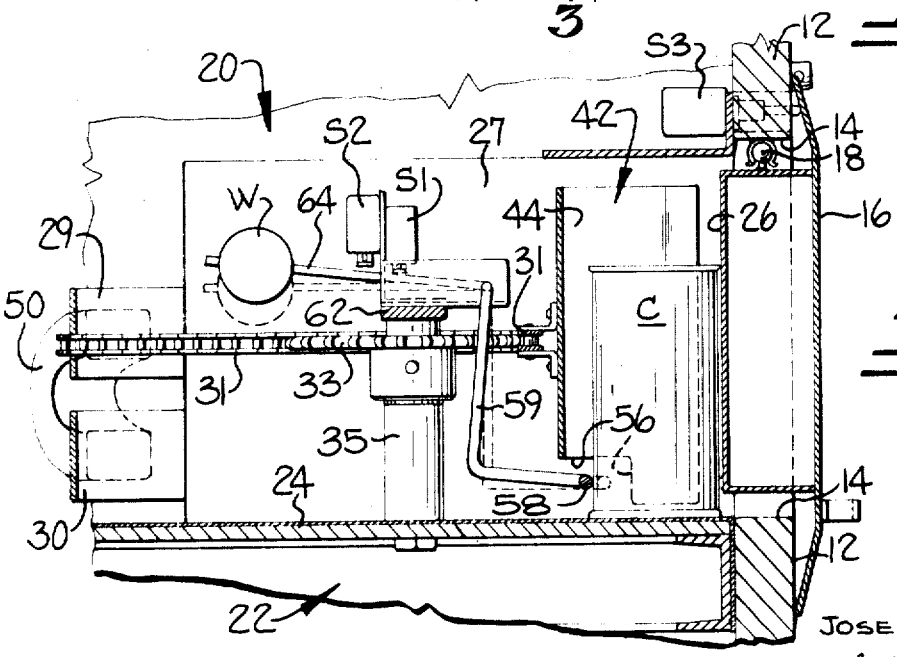
Fig-3
INVENTOR:
JOSEPH D. MYERS
By Barrett, Bell, Seltzer, Park & Heard
ATTORNEYS

PROCESS AND APPARATUS FOR COLLECTION OF METAL CONTAINERS

Original Filed July 25, 1967 4 Sheets-Sheet 2

INVENTOR:
JOSEPH D. MYERS

BY Parrott, Bell, Seltzer, Park & Gaard
ATTORNEYS

PROCESS AND APPARATUS FOR COLLECTION OF METAL CONTAINERS

Original Filed July 25, 1967 4 Sheets-Sheet 3

INVENTOR:
JOSEPH D. MYERS

By Parrott, Bell, Seltzer, Park & Gaard
ATTORNEYS

PROCESS AND APPARATUS FOR COLLECTION OF METAL CONTAINERS

Original Filed July 25, 1967 4 Sheets-Sheet 4

INVENTOR:
JOSEPH D. MYERS

BY Barrett, Bell, Seltzer, Clark & Feard.
ATTORNEYS

United States Patent Office

Re. 27,643
Reissued May 8, 1973

27,643

PROCESS AND APPARATUS FOR COLLECTION OF METAL CONTAINERS

Joseph D. Myers, P.O. Box 384, Hickory, N.C. 28601

Original No. 3,412,837, dated Nov. 26, 1968, Ser. No. 655,789, July 25, 1967. Application for reissue Aug. 10, 1969, Ser. No. 62,535

Int. Cl. G07f *1/06*

U.S. Cl. 194—4 C 15 Claims

Matter enclosed in heavy brackets [ ] appears in the original patent but forms no part of this reissue specification; matter printed in italics indicates the additions made by reissue.

ABSTRACT OF THE DISCLOSURE

A process and apparatus for collecting and storing used metallic containers and automatically dispensing tokens for containers collected, wherein a plurality of collected containers are moved along a generally horizontal trackway, nonmagnetic containers therein gravitationally separated from the trackway, crushed, and stored while a token is automatically dispensed for each nonmagnetic metallic container stored, and wherein magnetic containers remaining on the trackway are thereafter separately stored in a suitable receptacle of the apparatus.

This invention relates to a process and apparatus for collecting used containers, and more particularly for collecting and storing empty metallic containers and for dispensing tokens for containers collected.

Heretofore, metallic containers used to package comestible items have not been recovered for reuse because the metals used in the containers were relatively inexpensive so as to make their recovery economically impractical, and because of the difficulties of handling and storing the used containers which generally contained undesirable food residue. Currently, however, many metal containers particularly used in the packaging of beer and soft drinks are being made of aluminum which is desirable because of its light weight, low incidence of food contamination, and the ease with which cans of aluminum may be opened by the consumer.

Since aluminum is appreciably more expensive than the more conventional metals used in cans and can be readily recovered and refabricated, it has become desirable to provide some economical means of collecting and storing such cans. Additionally, the growing problem of unsightly litter of empty cans along the highways and in recreational areas has created a need for some means of inducing the public to collect and effectively dispose of such used metal cans, thus reducing the aforementioned little problem.

It is therefore an object of the present invention to provide a process and apparatus for receiving, collecting, and storing metallic containers of the types described, and for dispensing tokens for the containers collected, which tokens may be exchanged for currency or merchandise as an incentive for the collection of the containers.

It is another object to provide a device for collecting empty metallic containers and dispensing tokens therefor, wherein the containers are crushed to reduce their size and thereby permit the storage of a larger number of containers in the device.

It is another object to provide a device for collecting empty metallic containers, separating from the containers collected containers of a particular type, crushing the separated containers to reduce their size, storing the containers and dispensing a token for each of the separated containers stored.

It is a more specific object to provide a device for collecting and storing empty aluminum cans, such as those used in the beverage industry, and for dispensing a token for each of the aluminum cans collected, while providing means for storing nonaluminum cans placed in the device by a consumer.

Some of the objects of the invention having been stated, other objects will appear as the description proceeds, when taken in connection with the accompanying drawings, in which:

FIGURE 1 is an overall perspective view of the collection and storage device of the present invention;

FIGURE 2 is an enlarged sectional view taken generally along line 2—2 in FIGURE 1 and showing the upper compartment containing the major operating components of the device;

FIGURE 3 is a further enlarged fragmentary sectional view taken generally along line 3—3 of FIGURE 2;

Figure 4:
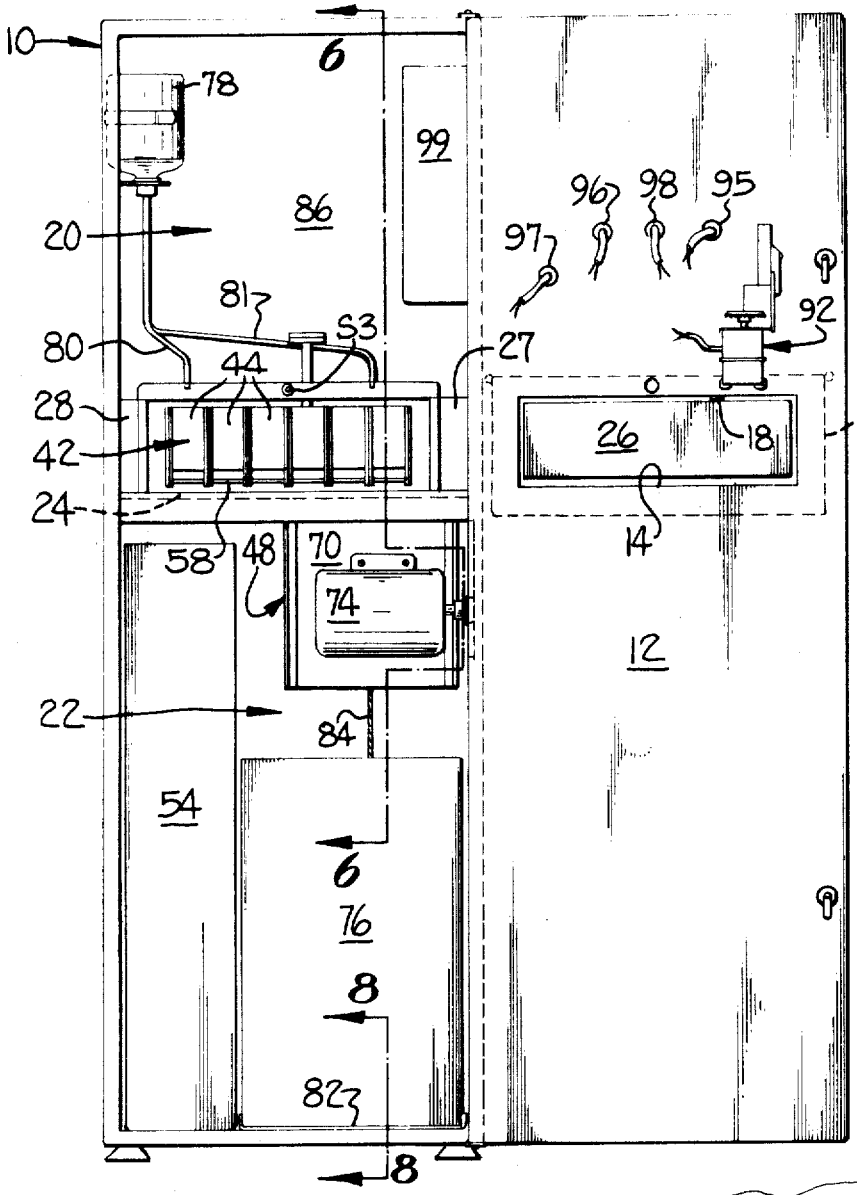
FIGURE 4 is an enlarged front elevation of the device seen in FIGURE 1, with the front wall of the housing of the device open to better show the interior of the housing.

Referring more specifically to the drawings, FIGURE 1 shows a collection and storage device of the present invention which includes a generally rectangular housing 10, a side wall 12 of which is pivotally mounted to provide access to the interior of the housing for maintenance and periodic removal of the containers collected therein. The pivotal side wall 12 of the housing has an elongate opening 14 (FIGURES 2 and 3) to permit insertion of the metal cans into the housing, and the opening is normally closed by an access door 16 pivotally secured to the housing wall at its upper edge and held in normally closed position by a spring catch 18 (FIGURE 3).

Figure 6:
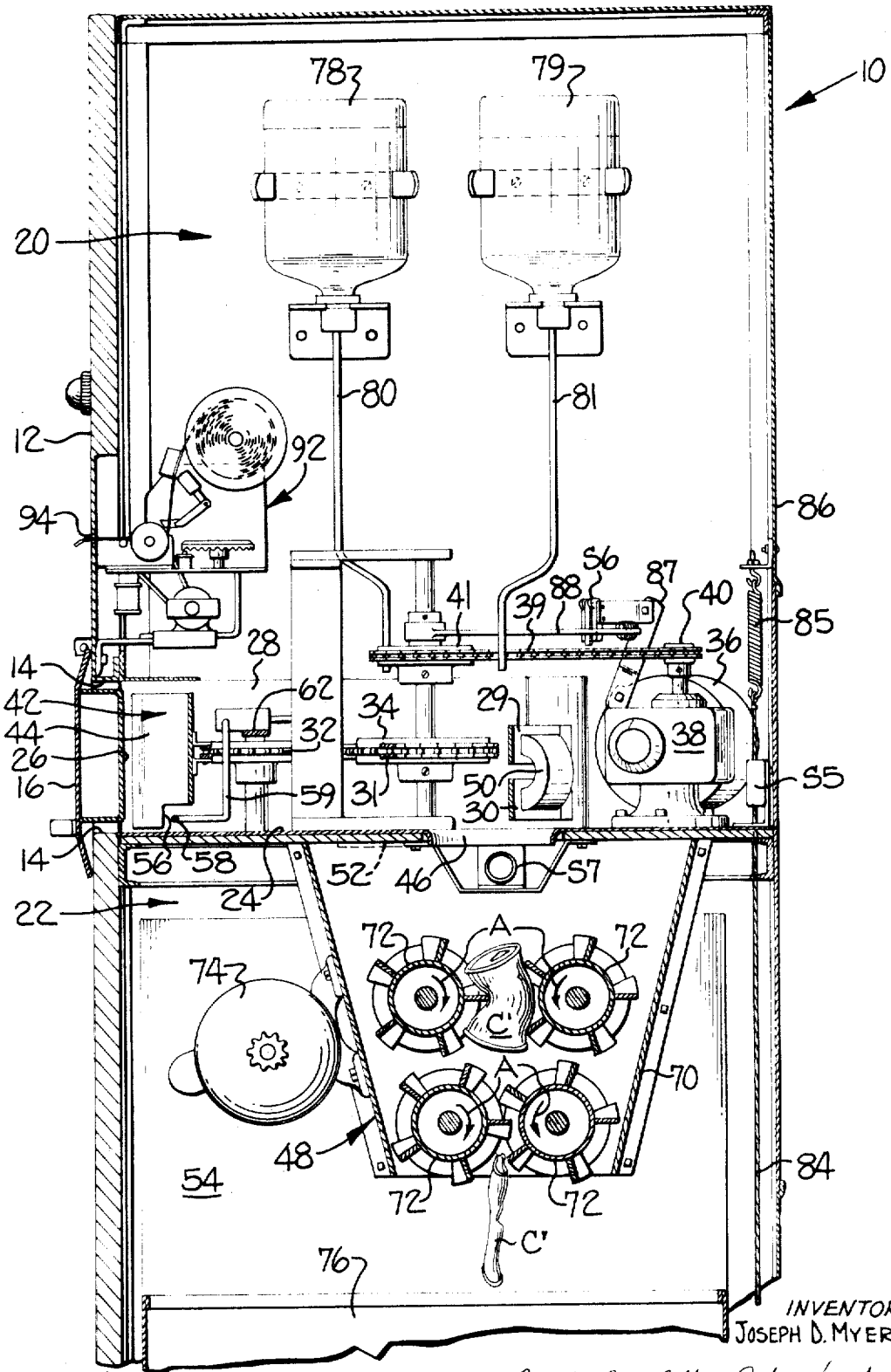
FIGURE 6 is an enlarged fragmentary sectional view taken generally along line 6—6 of FIGURE 4.

As best seen in FIGURE 4, the interior of the housing is horizontally divided into upper and lower compartments 20, 22 by a partition plate 24 suitably secured to the side walls of the housing. The elongate opening 14 in the housing wall 12 communicates with the upper compartment of the housing and provides access to the major operating components of the device. Located on the partition plate 24 which serves as a floor of the upper compartment 20, is a triangularly-shaped trackway 25 (FIGURE 2) which supports and guides metal cans C placed in the upper compartment by a customer for travel in a generally horizontal path over the partition plate. The outer periphery of the trackway 25 is defined, in part, by the inner face 26 of the access door 16 and, in part, by two suitably bent guide members 27, 28 which are suitably secured to the partition plate 24 and interconnected at a point remote from the access door 16 by a pair of spaced, horizontally disposed metal bars 29, 30 (FIGURES 2 and 6). The inner periphery of the trackway is defined by an endless conveyor chain 31 which forms a portion of the conveying mechanism of the device for transporting metal cans about the trackway.

The endless chain 31 of the conveyor mechanism is supported for movement in a horizontal plane by three triangularly-spaced sprocket wheels 32, 33, 34 which are mounted on stub shafts, one of which 35 is shown in FIGURE 3, secured to the partition plate 24. The conveyor chain 31 is moved in counterclockwise direction about the trackway 25 by a conveyor motor 36 which is operatively connected to drive the conveyor chain 31 through a reduction gear unit 38 and a flexible drive element or chain 39 connecting an output sprocket wheel 40 on the reduction gear unit to a smaller sprocket wheel 41 rotatively fixed to the larger sprocket wheel 34 supporting the conveyor chain 31.

Located along a first portion of the trackway adjacent the access door 16 are a plurality of container-receiving compartments 42, each of which consists of a generally U-shaped enclosure member 44 which is pivotally secured to the conveyor chain 31 for movement therewith, and has an open side facing outwardly from the chain to communicate with the access opening 14 in the housing 10 when the compartments 42 are positioned as seen in FIGURE 2. Each compartment 42 is adapted to receive a metal container C placed in the housing by a customer and to move the container along the trackway 25 during operation of the conveyor mechanism. The U-shaped enclosure members provide for positive engagement of the containers or cans on three sides of the same throughout their vertical heights, thereby insuring proper trackway movement of conventional metal cans, as well as composite cans which are generally constructed of a cardboard main body and metal ends.

Located on a second portion of the trackway counterclockwise from the access door 16 and immediately adjacent the horizontal bars 29, 30, is a horizontally-disposed opening 46 in the partition plate 24. The trackway opening 46 is of sufficient size to permit passage of metal cans therethough and directly communicates with a crusher mechanism 48 (FIGURES 4 and 6) located in the upper portion of the lower compartment 22.

Secured to the outer portion of the horizontal bars 29, 30 are a plurality of bars magnets 50 which attract magnetic cans and draw them partially out of the conveyor compartments and into contact with the horizontal bars during their movement along the trackway over the opening 46. As can best be seen in FIGURE 2, that portion of the periphery of the opening 46 closest the horizontal bars is spaced therefrom to provide a narrow ledge **46*a* of the partition plate 24 beneath the bars which cooperate with the mangets 50 to support the magnetic cans during their movement over the opening 46. Conversely, nonmangetic cans, such as those made of aluminum or another nonferrous metal, are permitted to drop by gravity through the opening 46** during their passage over the trackway and fall into the crusher mechanism.

To accommodate magnetic cans held on the trackway 25 by the bar mangets 50 during their passage over the trackway opening 46, a second horizontally-disposed trackway opening 52 is provided in the partition plate further along the trackway and it serves to permit gravitational removal of the remaining cans retained on the trackway as the conveyor compartments 42 pass over the opening 52. A large receptacle 54 (FIGURE 4) is located in the lower compartment 22 of the housing 10 directly beneath the second opening 52 and is adapted to receive containers dropping through the opening and store the same until they can be subsequently removed from the device.

To operate the conveying mechanism when one or more cans are inserted through the access opening 14 and into the conveyor compartments 42, a series of switches and relay mechanisms are provided. As seen in FIGURE 3, a lower portion of the side and rear walls of each of the conveyor compartments is cut away, as at 56, to receive an elongate actuating bar 58 which extends over the portion of the trackway adjacent the housing door 16 and is supported by rod-shaped arms 59, 60 which are pivotally mounted on a cross member 62 between the sprocket wheel stub shafts. The bar is biased against displacement out of the compartments 42 and away from the access door 16 by a counterweight W which is mounted on the outer end of a generally horizontally-extending lever arm 64 attached to the rod-shaped support arm 59. Mounted directly above the lever arm on the cross member 62 and in vertically spaced relation, are a pair of switches S1, S2 which, depending on the degree of displacement of the actuating bar 58, are sequentially engaged by the lever arm 64 to permit energization of or to deenergize, respectively, the conveyor motor 36, as will be explained. The actuating bar 58 is displaced from its position over the trackway (see in dotted lines FIGURE 3) by a customer by firmly inserting a metal can into one of the compartments a sufficient distance to at least momentarily close switch S1. After a desired number of cans have been placed in the compartments, the access door 16 is closed to contact and close a plunger-type switch S3 located in the upper right-hand inside corner of the door, which switch energizes proper relays to supply electrical current to operate the conveyor motor 36 and crusher motor 74. The switch S3 also provides a safety function in that it deenergizes the conveyor and crusher motors if the access door is inadvertently open during operation of the conveyor mechanism.

In the event that on oversized or irregularly-shaped can which would not pass through the trackway openings is placed in one of the conveyor compartments 42 and the access door 16 closed, the actuating bar 58 will be displaced from the compartment 42 a sufficient amount to cause the lever arm 64 to maintain the normally closed switch S2 open and thereby prevent operation of the conveyor mechanism upon the closing of the door switch S3.

Figure 5:
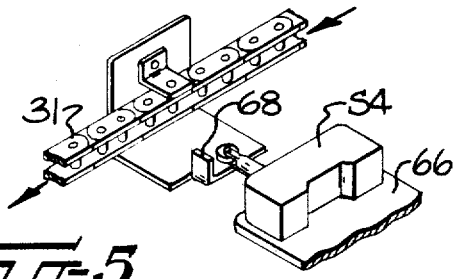
FIGURE 5 is an enlarged fragmentary perspective view of a reset switch of the device looking in the direction of arrow 5 in FIGURE 2.

To deenergize the conveyor motor 36 and thereby stop the movement of the can conveying compartments 42 when they have completed a full passage about the trackway 25 and have returned to their can-receiving position adjacent the access opening 14, a normally closed cycle switch S4 located on a bracket 66 adjacent the endless conveyor chain 31, is tripped by a cam finger 68 (FIGURE 5) on the chain 31 to stop operation of the conveyor and crusher motors. The details of the operation of these and the other actuating switches of the electrical control system will be discussed hereinafter.

The crusher mechanism 48 in the lower compartment of the housing (FIGURES 4 and 6) is composed of an enclosure housing 70 in which are located a plurality of rotatable, intermeshing crusher elements 72. An electric motor 74, mounted on the outside of the enclosure housing 70, is connected by a suitable gear train (not shown) to rotate the crusher elements 72 in the directions indicated by the arrows A. The lower open end of the crusher housing communicates with the open top of a receptacle 76 so that cans passing from the trackway opening 46 through the crusher elements 72 drop by gravity into the receptable 76 for storage.

To prevent undesirable odors and unsanitary conditions from occurring in either of the receptacles 54, 76 due to food particles remaining in the crushed metal containers stored therein, a pair of chemical supply bottles 78, 79 (FIGURE 6) are mounted on the inner wall of the upper compartment 20 and have conduits 80, 81 which extend therefrom to positions above the respective openings 46, 52 in the partition plate 24 to dispense a deodorizing and germicidal chemical into the receptacles.

Figure 8:
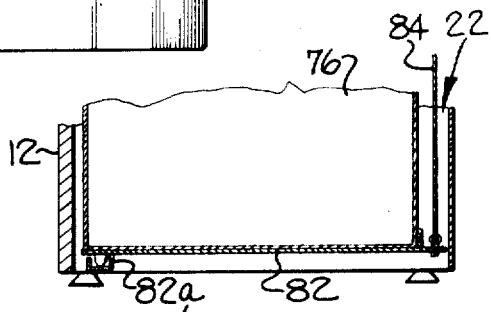
FIGURE 8 is an enlarged fragmentary sectional view of the lower portion of the housing taken generally along line 8—8 of FIG. 4.

To prevent operation of the collection device when either of the storage receptacles 54, 76 is full of cans, means are provided a deenergize the conveyor motor until the receptacles are emptied. As best seen in FIGURE 8, the nonmagnetic or aluminum can storage receptacle 76 rests on a flat metal plate 82 which is pivotally supported at its front edge by a tongue and groove bracket assembly 82*a* mounted on the floor of the enclosure housing 10, and is supported at its rear edge by a flexible element 84 attached by a spring 85 (FIGURE 6) at its upper end to the rear wall 86 of the housing 10. When the receptacle 76 is substantially filled with aluminum cans, the weight of the cans extends the spring 85 a sufficient distance to cause a cam finger (not shown) on the flexible member to engage and open a normally-closed spring-biased switch S5 mounted on the rear wall of the upper compartment. The switch S5 is electrically connected to the conveyor motor and crusher motor so that when it is opened by the cam finger, both motors are deenergized until the receptacle 76 is emptied of cans and the switch again closed.

In like manner, when the magnetic can storage receptacle 54 is full and an additional container drops into the trackway opening 52 during the passage of the container compartments 42 thereover, it will lodge in the opening and jam against the rear wall 44 of the moving conveyor compartment in which it is carried. To prevent damage to the conveying mechanism and stop the conveyor motor 36 until the jammed can may be manually removed from the opening 52 and the receptacle 54 emptied, a receptacle safety switch S6 (FIGURE 2) mounted on the bracket 87 attached to the conveyor motor 36 opens to stop the motor. The switch S6 is normally held closed by a spring-biased lever arm 88 which is pivotally mounted on the rear sprocket stub shaft and has a freely rotatable sprocket wheel 89 which engages the flexible drive element 39. When excess tension is exerted on the flexible drive element 39, as will be the case when a can jams between the trackway opening 52 and one of the conveyor compartments 42, the flexible drive element 39 displaces the arm member 88 from the switch S6 to open the same and deenergize the conveyor motor 36 and crusher motor 74.

The dispensing mechanism of the collection device, which operates to issue a redeemable token to a customer in response to the collection of an aluminum can, includes a proximity switch S7 (FIGURE 6) located in the crusher enclosure housing 70 just below the trackway opening 46. The proximity switch is of a conventional type which senses the presence of metal passing through the opening and electrically actuates a stamp dispenser 92 mounted on the front wall of the upper compartment adjacent a token outlet 94. The electrical control system of the collection device is housed in a box 99 located on the side wall of the upper compartment and its operation may best be described by reference to the schematic wiring diagram shown in FIGURE 7.

Figure 7:
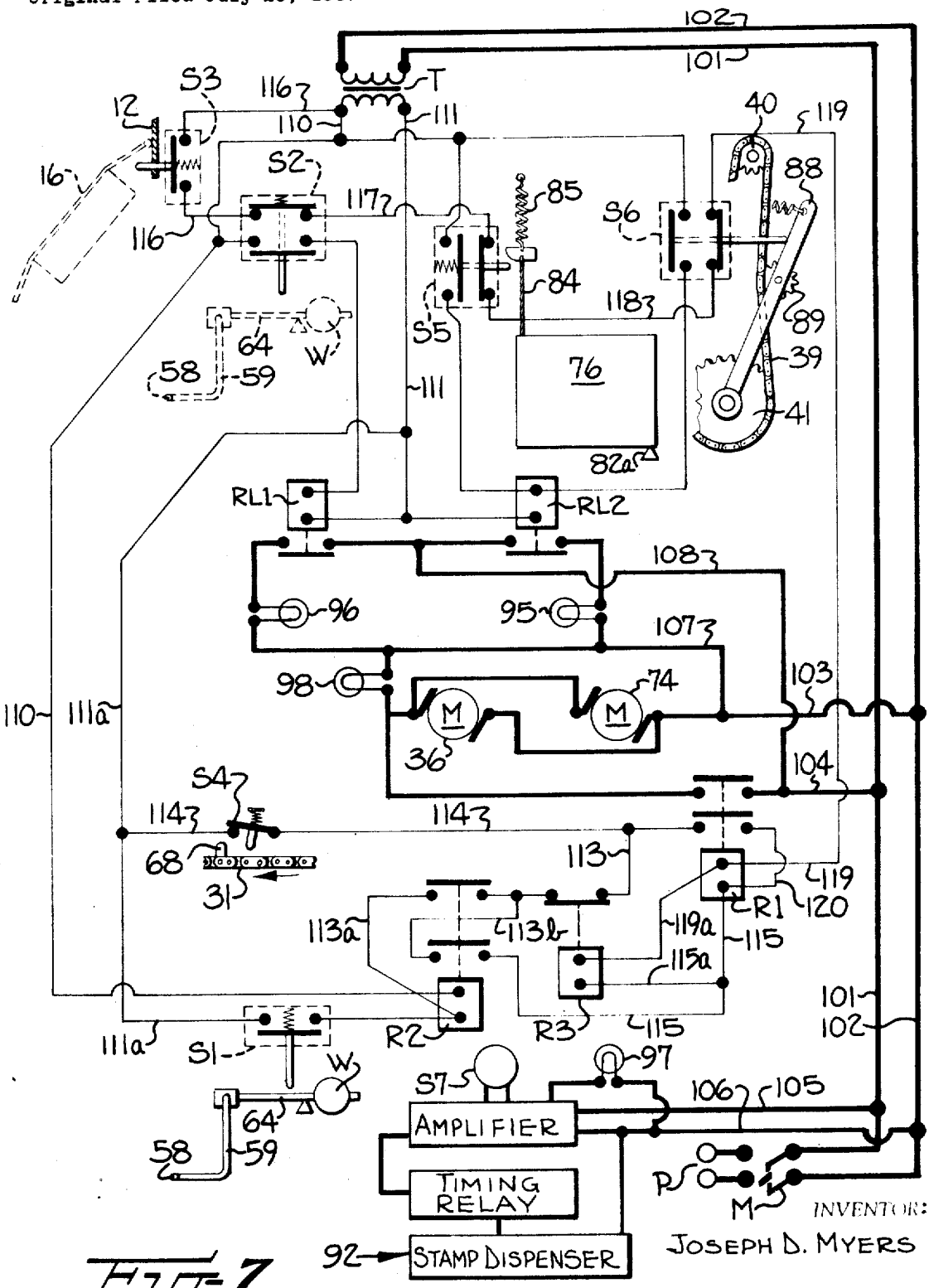
FIGURE 7 is a schematic wiring diagram of the electrical control circuit of the collection device.

Referring now to FIGURE 7, suitable line current, such as 120 volts, is supplied from a primary power source P, through a master switch M and primary conductors 101, 102 to the high voltage winding of a transformer T, and also to the conveyor motor 36 and crusher motor 74 by way of additional conductors 103, 104 and a normally open contact set of a relay switch R1. Line voltage is also supplied to the stamp dispenser 92 through an electrical circuit composed of conductors 105, 106 and the normally-open proximity switch S7. Conventional amplifier and time delay mechanisms (shown as block diagrams) are appropriately located in the stamp dispenser circuit to ensure full cycle operation of the dispenser upon actuation by the proximity switch S7.

The opening and closing of the contact set of relay switch R1 which complete the circuit between the power source P and the conveyor and crusher motors is effected by control circuits, which include a plurality of conductors and the various actuating switches S1–S6, which electrically conduct a reduced current, such as 24 volts, from the low voltage winding of the transformer T to the coil of the relay R1. As seen, momentary closing of normally-open switch S1 by displacement of the actuating bar 58 establishes a circuit between the low voltage side of the transformer T and the coil of a relay $R^2$ through conductors 110, 111, 111a, 112 to close the normally-open double contact sets of the relay, which sets are thereafter maintained closed by a holding circuit to the coil through the conductor 110 and the conductors 111, 111a, 114, 113, a normally-closed relay switch R3, one contact set of the relay R2, and a conductor 113b. Thereafter, when the normally-open access door switch S3 is closed, an electrical circuit is established between the low voltage winding of the transformer T and the coil of the relay R1 through conductors 111, 111a, 114, 113, normally-closed relay switch R3, conductor 113b, the closed contact set of relay R2, and conductor 115, and conductors 116, 117, 118 and 119 and the normally-closed contact sets of the double pole switches S2, S5 and S6. The closing of the access door switch S3 also supplies current, by way of conductors 119a and 115a, to open the contact set of normally-closed relay switch R3 to break the holding circuit to the coil relay R2, thereby opening its contact sets for subsequent reactivation by the actuating bar 58. The relay R3 is rated to operate slower than the relay R1 to insure that the contact sets of R1 close before the opening of the set of R3. To prevent contact sets of the relay R1 from opening when the relay switch R3 opens, a secondary holding circuit is established to the coil of relay R1 through conductors 111, 111a, 114, the normally-closed cycle switch S4, one contact set of relay R1, and a conductor 120 leading to one side of the relay coil, and the aformentioned conductors 116–119 containing switches S2, S5 and S6 leading to the other side of the coil.

As may be observed, after the contact sets of relay R1 have been closed to start the conveyor and crusher motors, the motors operate throughout a normal cycle to move the can-conveying compartments about the trackway until the compartments return to their position adjacent the access door 16, at which time the cam finger 68 on the conveyor chain 31 trips the normally-closed cycle switch S4 to break the holding circuit to the coil of relay R1 and open its relay sets to deenergize the motors.

In the event that an oversize or irregular-shaped can is placed in one of the conveyor compartments, the actuator bar 58 (as shown in dotted lines in FIGURE 7) is sufficiently displaced to open the normally-closed contact set of the bent can sensing switch S2 and thereby prevent the closing of the door switch S3 from completing the circuit to the coil of relay R1. In like manner, if either of the container receptacles becomes full during the operation of the conveyor and crusher motors, the normally-closed contact sets of switches S5 and S6 open, as previously described, to break the circuit to the coil of relay R1 and deenergize the motors until the receptacles can be emptied.

As previously mentioned, each of the switches S2, S5 and S6 are double pole and, in addition to the normally-closed contact set, include a normally-open contact set which is located in a conductor line leading from the low voltage side of the transformer T to a pair of normally-open relay switches $R_{L1}$ and $R_{L2}$, the contact sets of which control line voltage current to the indicator lights 96 and 95, respectively, through high voltage conductors 101–104, 107, and 108. Thus, when the normally-open contact set of switch S2 is closed by displacement of the actuating bar 58, indicator light 96 located on the front wall of the housing (FIGURE 1) notifies a customer when an improper size can has been placed in the collection device. In similar manner, when either of the normally-open contact sets of receptacle switches S5 and S6 is closed due to the filled condition of one of the receptacles, the relay switch $R_{L2}$ is closed to light the indicator light 95 and notify a customer of the condition. Similar indicator lights 97 and 98, which are also located on the front of the housing (FIGURE 1), are suitably connected across the high voltage conductors leading to the stamp dispenser 92 and motors 36 and 74, respectively, to indicate to a customer when the dispenser and the motors are in operation.

To operate the collection device, a customer opens the housing access door, firmly inserts one of the metallic cans in the conveyor compartments to depress the actuating bar 58 and close switch S1, and closes the door. If all the cans are the proper size and shape to pass through the trackway openings, the closing of the door 16 energizes the conveyor motor and crusher motor to move the compartments about the trackway. As the compartments 42 approach the bar magnets 50 adjacent the first trackway opening 46, the magnets attract the magnetic cans therein and draw then against the horizontal bars 29 and 30, where they are held by the attractive forces of the magnets and the lower ledge 46a, and the pass over the trackway opening 46. Conversely, the nonmagnetic aluminum cans are not attracted by the magnets but drop through the opening 46 and in the crusher mechanism 48 therebelow. As each nonmagnetic can separated from the trackway passes the proximity switch S7 below the opening, the switch actuates the stamp dispenser 92 to discharge a stamp through the token opening 94 of the enclosure housing 10. The aluminum can C' (FIGURE 6) fall by gravity into and through the crusher elements 72 where they are substantially reduced in size and fall into the storage receptacle 76.

Magnetic cans continue to move along trackway 25 in the conveyor compartments until they pass over the second trackway opening 52 where they, in like manner, drop by gravity into the storage receptacle 54 therebelow. After discharging all of the cans, the conveyor compartments 42 continue to move about the trackway to their initial container-receiving position adjacent the access door 16 where they are stopped automatically by the opening of cycle switch S4 which deenergizes the conveyor and crusher motors.

As can be appreciated, the collection device illustrated and described herein is designed primarily to receive and collect only aluminum cans, and dispense redeemable tokens therefor; while other type metallic cans are collected only incidentally, when inadvertently placed in the device by a customer. It should be understood, however, that the device may also be used to collect all type metal cans, and an additional crusher mechanism may be provided to reduce the size of the magnetic cans and thereby increase the capacity of the device. An additional proximity switch may also be provided so that redeemable coupons may be issued for all cans collected. Alternatively all cans may be collected in a single receptacle, in which case the magnet separators could be omitted from the trackway and a single trackway opening utilized.

In the drawings and specification there has been set forth a preferred embodiment of the invention and although specific terms are employed, they are used in a generic and descriptive sense only and not for purposes of limitation, the scope of the invention being defined in the claims.

That which is claimed is:

1. A device for collecting and storing empty metallic containers and for dispensing tokens therefor, comprising means for receiving such containers, means associated therewith for automatically dispensing a token for containers received, means cooperating with said receiving means for crushing containers to reduce their size, and storage means for receiving containers from said crushing means and storing the same.

2. A device as defined in claim 1 including means operatively associated with said receiving means for automatically separating from the received containers all containers of a certain type, and wherein said automatic dispensing means dispenses a token only for containers of said certain type.

3. A device as defined in claim 2 including a generally horizontally-disposed trackway adapted to support a plurality of containers thereon; said receiving means comprising a first portion of said trackway; and said separating means comprising a second portion of said trackway adjoining said first portion and having a downwardly-facing opening therein, means for conveying containers along said trackway and means disposed along said second portion of said trackway adjacent said opening for supporting magnetic containers on said trackway during their movement over said opening.

4. A device as defined in claim 3 wherein said means for supporting magnetic containers include magnetic means for attracting magnetic containers during their movement over said opening while permitting nonmagnetic containers to drop through said opening and be removed from said trackway.

5. A device as defined in claim 3 wherein said dispensing means includes means adjacent said opening in said trackway for sensing the passage of containers therethrough, and a token dispenser associated with said sensing means and operable thereby to dispense a token for each of said containers detected by said sensing means.

6. A device as defined in claim 3 including a housing enclosing said trackway, an access door in said housing positioned adjacent said first portion of said trackway and permitting manual insertion of containers into said housing and onto said first portion, and means preventing operation of said conveying means when said access door is open.

7. A device as defined in claim 6 wherein said conveying means includes a plurality of container-receiving compartments initially positioned adjacent said access door and adapted to move along said trackway during the operation of said conveying means; and means responsive to the insertion of a container in one of said compartments to permit initiation of movement of said compartments upon closing of said access door.

8. A device as defined in claim 7 wherein said means responsive to the insertion of a container further senses the size and shape of said container and prevents movement of said compartments when said container is irregularly proportioned.

9. A device as defined in claim 3 wherein said crushing means includes a plurality of rotatable, intermeshing crusher elements positioned beneath said opening in said trackway for the reception of nonmagnetic containers, and wherein said storage means for receiving containers from said crushing means includes an open-top receptacle located below crushing elements and in the path of movement of said containers passing therefrom.

10. A device as defined in claim 9 including a third portion of said trackway adjoining said second portion and having an additional downwardly-facing opening therein for passage of said magnetic containers, and said storage means including an additional receptacle positioned below said additional opening for receiving said metallic containers and storing the same.

11. A device as defined in claim 10 including means preventing operation of said conveying means when said receptacles are full of containers.

12. A method of collecting and storing empty metallic containers, and issuing a token for containers collected, comprising the steps of (a) receiving containers,
(b) dispensing a token for containers received,
(c) crushing containers to reduce their size, and
(d) depositing the crushed containers in a receptacle for storage.

13. A method as defined in claim 12 including conveying said received containers in a predetermined path while selectively removing from said path all containers of a certain type, and dispensing a token for only those containers removed from said path.

14. A method as defined in claim 13 including the step of crushing only said containers of a certain type, and depositing the non-selected containers remaining in said path in an additional receptacle for storage.

15. A method as defined in claim 13 wherein said containers are moved in a generally horizontally-disposed path, and wherein said containers of a certain type are removed from said path by gravity.

References Cited

The following references, cited by the Examiner, are of record in the patented file of this patent or the original patent.

UNITED STATES PATENTS

| | | | |
|---|---|---|---|
| 2,697,513 | 12/1954 | Krupp et al. | 209—111.8 |
| 3,039,583 | 6/1962 | Menefee | 194—4 C |
| 3,489,354 | 1/1970 | Harper et al. | 241—99 X |
| 2,558,255 | 6/1951 | Johnson et al. | 241—99 |
| 3,015,376 | 1/1962 | Glembring | 194—4 |

STANLEY TOLLBERG, Primary Examiner